(12) United States Patent
Ould-Brahim

(10) Patent No.: US 7,532,630 B2
(45) Date of Patent: May 12, 2009

(54) GENERALIZED LAYER-2 VPNS

(75) Inventor: Hamid Ould-Brahim, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 911 days.

(21) Appl. No.: 10/657,953

(22) Filed: Sep. 9, 2003

(65) Prior Publication Data
US 2004/0081172 A1    Apr. 29, 2004

Related U.S. Application Data

(60) Provisional application No. 60/410,862, filed on Sep. 13, 2002.

(51) Int. Cl.
*H04L 12/28* (2006.01)
(52) U.S. Cl. ...................................... 370/401
(58) Field of Classification Search ............ 370/395.53, 370/351, 401; 709/238, 227
See application file for complete search history.

(56) References Cited

OTHER PUBLICATIONS

Ould-Brahim et al. BGP/GMPLS Optical VPNs, Jan. 2002.*
Ould-Brahim et al. GVPN: Generalized Provider-provisioned Port-based VPNs using BGP and GMPLS, Aug. 2002.*
PCT/CA03/01075—PCT International Search Report Nov. 20, 2003.
Ould-Brahim, "Optical VPNs"; XP002252507, Retrieved from the Internet::http://www.norteinetworks.com/products/library/collateral/mpls2001)vp n_tutorial; (retrieved on Aug. 25, 2003, the whole document.
Ould-Brahim, "BGP/GMPLS Optical/TDM VPNs", XP002252506, Retrieved from the Internet, http://www.watersprings.or/pub/id/ draft-ouldbrahim-bgpgmpls-ovpn-02.txt; retrieved on Aug. 25, 2003, p. 2, paragraph 1—p. 12, paragraph 8.
Yong Xue et al, Carrier Optical Services Requirements XP002252508, retrieved from the Internet: http://www.potarop.net/left/xid-ids/draft-ietf-ipo-carrier-requirements-02.txt, retrieved on Aug. 25, 2003, p. 10, paragraph 4.2-p. 29, paragraph 9.
Ould-Brahim et al, "Service requirements for optical VPNs" 51th IETF, London, Aug. 2001, Online Aug. 2001, p. 1-7 XP002260632, retrieved from the Internet http://www.ietf.org/proceedings/01aug/slides/ppvpn-9.pdf, retrieved on Nov. 6, 2003, the whole document.
Yong Xue et al, "Carrier optical services requirements" Internet Draft, online May 19, 2001, pp. 1-46, XP002260633, retrieved from the Internet, http://www.ietf.org/proceedings/01aug/I-D/draft-ietf-jpo-carrier-requirements-00.txt, retrieved on Nov. 6, 2003; p. 5, paragraph 3.2—pp. 25, paragraph 8.3, p. 37, paragraph 9.3.1—p. 44, paragraph 11.2.
Rosen et al, "BGP/MPL VPNs-RFC2547bis" XP002242692, retrieved from the Internet, www.ietf.org, retrieved on May 27, 2003, the whole document.

(Continued)

*Primary Examiner*—Kevin C Harper
*Assistant Examiner*—Wanda Z Russell
(74) *Attorney, Agent, or Firm*—Ridout & Maybee LLP

(57) ABSTRACT

A generalized Layer-2 virtual private network arrangement and method is disclosed for layer-2 and/or layer-1 VPNs. The generalized Layer-2 VPN includes mechanisms which provide simplified provisioning and a degree of customer autonomy regarding establishing pseudo-wire connections without the assistance of the service provider across the service provider's network. The generalized Layer-2 VPN is particularly useful for overcoming the need for customers to be restricted to a particular transport or technology used within the provider network.

13 Claims, 5 Drawing Sheets

OTHER PUBLICATIONS

Ould-Brahim, "bgp based auto-discovery mechanism for optical vpns" 50th IETF, Minneapolis, Mar. 2001, Online May 2001, pp. 1-10, XP002260634, retrieved from the Internet, http://www.ietf.org/proceedings/01mar/slides/ppvpn-10.pdf, retrieved on Nov. 6, 2001, the whole document.
Chandraseker, "hierarchical vpn over mpls transport" Internet draft, online Jul. 2001 pp. 109, XP002260635, retrieved from the Internet, http://www.ietf.org/proceedings/01aug/i-D/draft-ietf-ppvpn-hiervpn-corevpn-00.txt, retrieved on Nov. 6, 2003, the whole document.
Martini, draft-ietf-pwe3-control-protocol-03; Internet draft Jun. 2003, pp. 1-26.
Martini, draft-martini-l2circuit-trans-mpls-11; Internet draft Apr. 2003, pp. 1-18.
Andersson, draft-ietf-ppvpn-l2-framework-01; Internet draft Aug. 2002, pp. 1-33.
Ould-Brahim, draft-ouldbrahim-ppvpn-gvpn-bgpgmpls-00; Internet draft Apr. 2002, pp. 1-18.
Ould-Brahim; draft-ietf-ppvn-bgpvpn-auto-02; Internet draft Jan. 2002, pp. 1-10.
Berger, draft-ietf-mpls-generalized-signaling-09; Internet draft Jan. 2003, pp. 1-2.
Rosen, draft-ietf-l2vpn-signaling-00; Internet draft Sep. 2003, pp. 1-20.
Awduche; rfc3209; Internet draft Dec. 2001, pp. 1-55.
Bates, multiprotocol-extensions-bgp-4, Internet draft Feb. 1998, pp. 1-9.

* cited by examiner

GENERALIZED LAYER-2 VPNS

RELATED U.S. APPLICATION DATA

Provisional application No. 60/410,862 filed on Sep. 13, 2002.

FIELD OF THE INVENTION

The present invention relates to switched virtual circuit (SVC) Layer-2 and layer-1 virtual private networks (L2VPNs and L1VPNs) and is particularly concerned with generalized L2VPNs using point-to-point connectivity to provide connections across provider networks.

BACKGROUND OF THE INVENTION

A Virtual Private Network (VPN) may be thought of as a private network constructed within a shared network infrastructure. In common terminology, these private networks are used by clients while the network infrastructure is supplied by providers.

Existing varieties of switched Layer-2 and/or Layer-1 VPNs have limitations affecting ease of implementation and use including:
- clients must store and manipulate provider addresses;
- clients need to be configured with all the provider addresses to which the client has a site attached;
- clients need to know about connection restrictions, such as for closed-user-group (CUG) values, and need to signal these values when establishing connectivity;
- clients encounter complexity in managing CUG rules; and
- clients need to implement an appropriate Layer-2 and/or layer-1 signalling mechanism proper to the transport technology.

In view of the foregoing, it would be desirable to provide a technique for providing generalized Layer-2 virtual private networks (GL2VPNs) which overcomes the above-described inadequacies and shortcomings.

SUMMARY OF THE INVENTION

An object of the present invention is to provide an improved generalized Layer-2 Virtual Private Network.

According to an aspect of the present invention there is provided a network for providing generalized Layer-2 VPNs, wherein the network includes a set of elements interconnected by services; at least one first subset of the elements defining a private network; and at least one second subset of elements different from said first subset defining a provider network wherein at least two subgroups of the first subset of elements may be connected via the provider network. The network also includes a provisioning mechanism used to define element membership in said first subset of elements; and a signalling mechanism used to create pseudo-wire connectivity between elements within the first subset of elements and across the second subset of elements at the Layer-2 and/or Layer-1 level.

Advantages of the present invention include the capability to support any Layer-2 and/or layer-1 VPN service to any network type using scalable common Layer-2 connections, and virtual private networks. GL2VPN does not restrict the layer-3, 2, and 1 service provider to a particular transport or technology used within the provider network. GL2VPN architecture includes intelligent functions for:
- Smart QoS handling;
- Generalized Single-sided signalling;
- a generalized auto-discovery mechanism;
- VPN membership distribution;
- VPN network selection; and
- Inter-network service resiliency.

Generalized Layer-2 virtual private networks provide this capability using open technology.

Conveniently the invention further provides for a network discovery mechanism used to propagate membership information regarding elements which are members of the first subset; and a service discovery mechanism used to propagate services information regarding services interconnecting elements in the first subset with elements in the second subset.

Also conveniently, the invention further provides for a manager mechanism having a first portion used to effect connection admission control and a second portion used to select encapsulation in response to a connection request; a multi-service tunnel selector mechanism used to create connectivity across the provider network; and a single-sided signalling mechanism used to initiate said connection request triggered by an element of the first subset.

In accordance with another aspect of the present invention, there is provided a method of organizing a network having a set of elements interconnected by services, wherein at least one first subset of the elements defines a private network and at least one second subset of elements different from the first subset defines a provider network and wherein at least two subgroups of the first subset of elements may be connected via the provider network. The method includes the steps of defining element membership in the first subset of elements via a provisioning mechanism; and creating pseudo-wire connectivity between elements within said first subset of elements at the Layer-2 and/or Layer-1 level across said second subset of elements via a signalling mechanism.

Conveniently, the method may further include the steps of propagating membership information regarding elements which are members of said first subset via a network discovery mechanism; and propagating services information regarding services interconnecting elements in said first subset with elements in said second subset via a service discovery mechanism. Further, the method may also conveniently contain the steps of effecting connection admission control via a first portion of a manager mechanism; selecting an encapsulation protocol in response to a connection request via a second portion of a manager mechanism; creating connectivity across the provider network via a multi-service tunnel selector mechanism; and initiating the connection request in response to a trigger by an element of the first subset via a single-sided signalling mechanism.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which.

DETAILED DESCRIPTION

Figure 1:
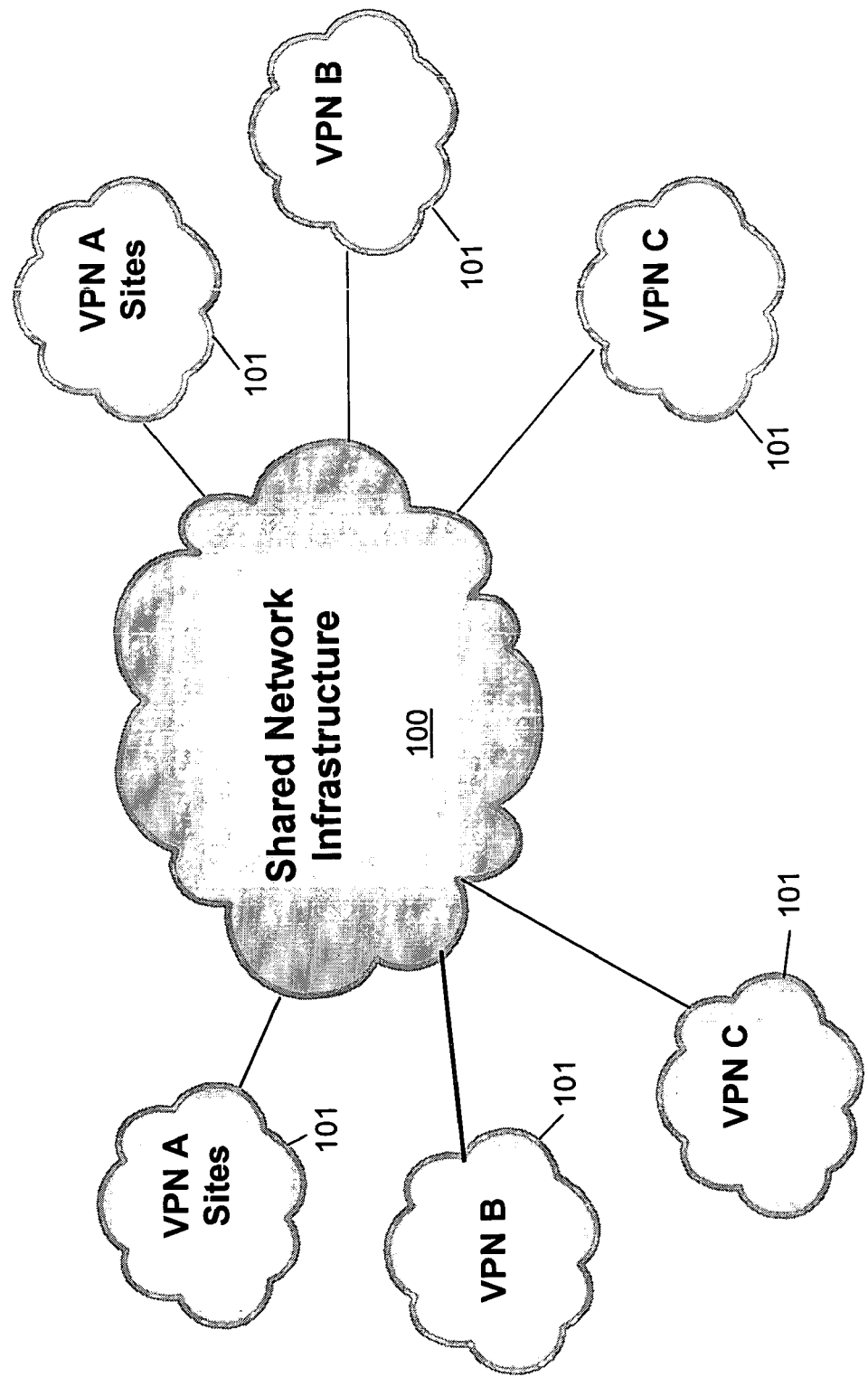
FIG. 1 is a diagram of a generic network having a shared network infrastructure and Virtual Private Networks associated thereto.

Glossary of Acronyms Used
P—Provider Device
PE—Provider Edge Device
CE—Customer Edge Device
SVC—Switched Virtual Circuit
PIT—Port Information Table
BGP—Border Gateway Protocol
BGP-AD—BGP Auto-Discovery
MPLS—Multi-Protocol Label Switching
DLCI—Data Link Connection Identifier
LMP—Link Management Protocol
ISP—Internet Service Provider Referring to FIG. 1, there may be seen a generic network having a shared network infrastructure 100 with connected virtual private network sites 101. The VPN sites 101 make use of the network infrastructure 100 to interconnect physically remote sub-networks of particular VPNs.

Several key aspects of the operation of generalized L2VPNs include:
 the control is decoupled from data plane;
 the access signalling protocols are decoupled from transport signalling.
 the transport layer decides whether it can meet the access QoS requirements;
 support is provided for N:1 type connections;
 support is provided for ATM, FR, Ethernet, MPLS L2VPNs, SONET/SDH; and
 additionally there is the potential capability for handling proprietary transport-based mechanisms; and
 GL2VPN makes the decision on what network to use should any decision be required.

The list of generalized Layer-2 VPN access support includes:
 Frame Relay VPN
 ATM VPN
 Ethernet VPN
 Frame Relay to ATM VPNs
 Frame Relay to Ethernet VPNs
 ATM to Ethernet VPNs
 ATM to MPLS
 Frame Relay to MPLS,
 Ethernet to MPLS
 Any to MPLS/IP to Any access.

Functions supported by generalized Layer-2 VPN include:
Generalized single-sided signalling extensions including:
 Interworking with Martini-type protocols and providing flexibility in terms of signalling, endpoint identification, and auto-discovery interaction;
 supporting Generalized Pseudo-wire (GPW) that can include layer-2 pseudo-wires and layer-1 connections;
 decoupling signalling and routing;
 allowing signalling to possibly traverse a network differently than the datapath;
 allowing Martini-based encapsulation protocols to be used with other signalling protocols (other than LDP) including standard-based or proprietary layer-2-based signalling protocols;
inherent interactivity with IP networking protocols:
 with or without MPL datapath; and
 including support for IP tunnelling including MPLS-in-IP encapsulation;
support of encapsulation protocols, including:
 existing standards; and
 Martini-based encapsulation;
signalling uses native transport signalling when a signalling choice is required.

Figure 2:
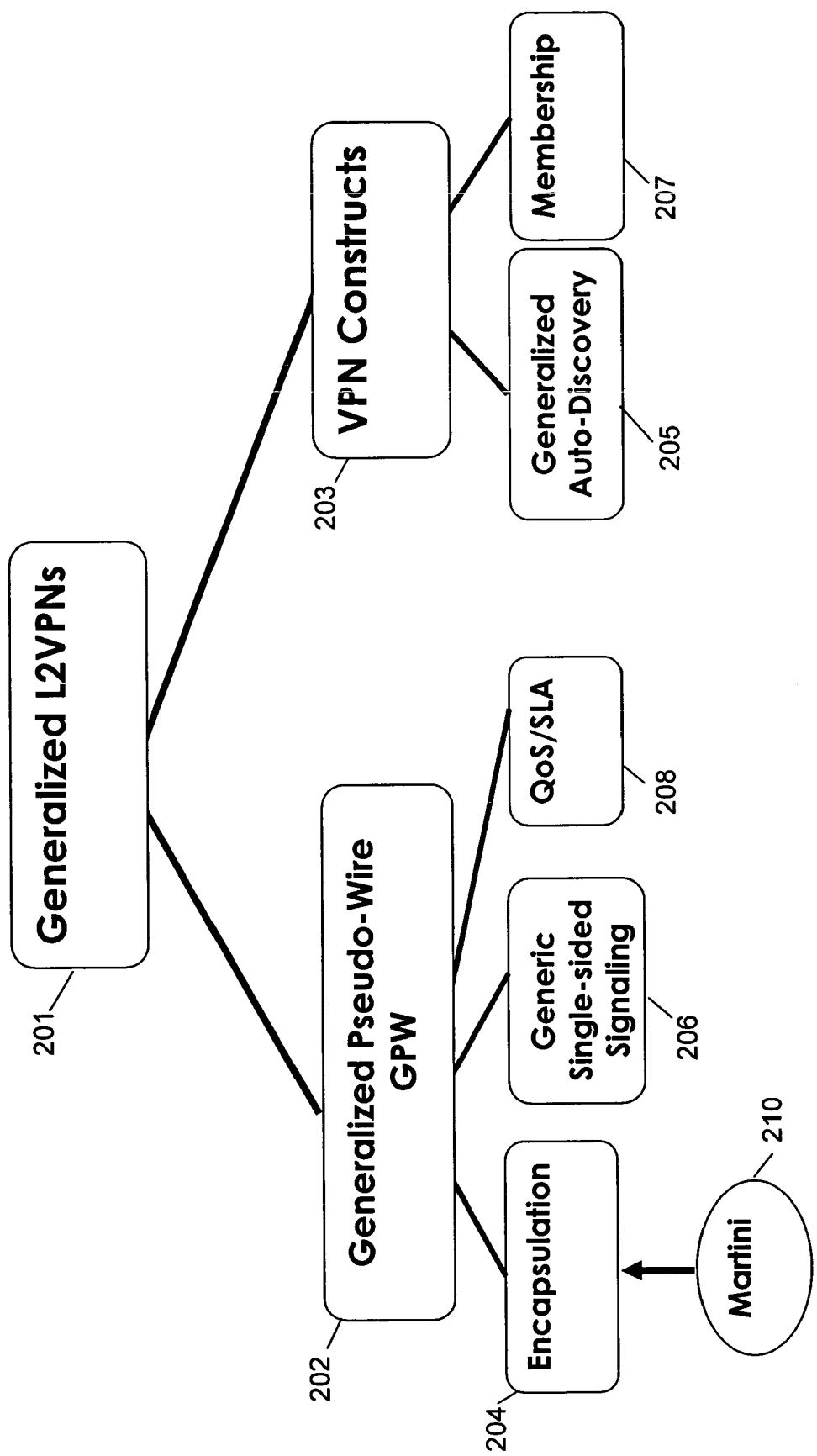
FIG. 2 is a block diagram of generalized Layer-2 VPN mechanisms according to an embodiment of the invention.

The generalized L2 VPN mechanisms are illustrated in FIG. 2 where the GL2VPN 201 has two distinct operations: the Generalized Pseudo-Wire operations 202, and the VPN Constructs operations 203. Subsumed under the Generalized Pseudo-Wire operations 202 are the Encapsulation operations 204, Generic Single-Sided Signalling operations 206 and Quality-of-Service/SLA operations 208. Subsumed under the VPN Constructs operations 203 are the Generalized Auto-Discovery operations 205 and the Membership operations 207. Martini-based encapsulation protocols 210 are specifically referenced under Encapsulation operations 204.

Figure 3:
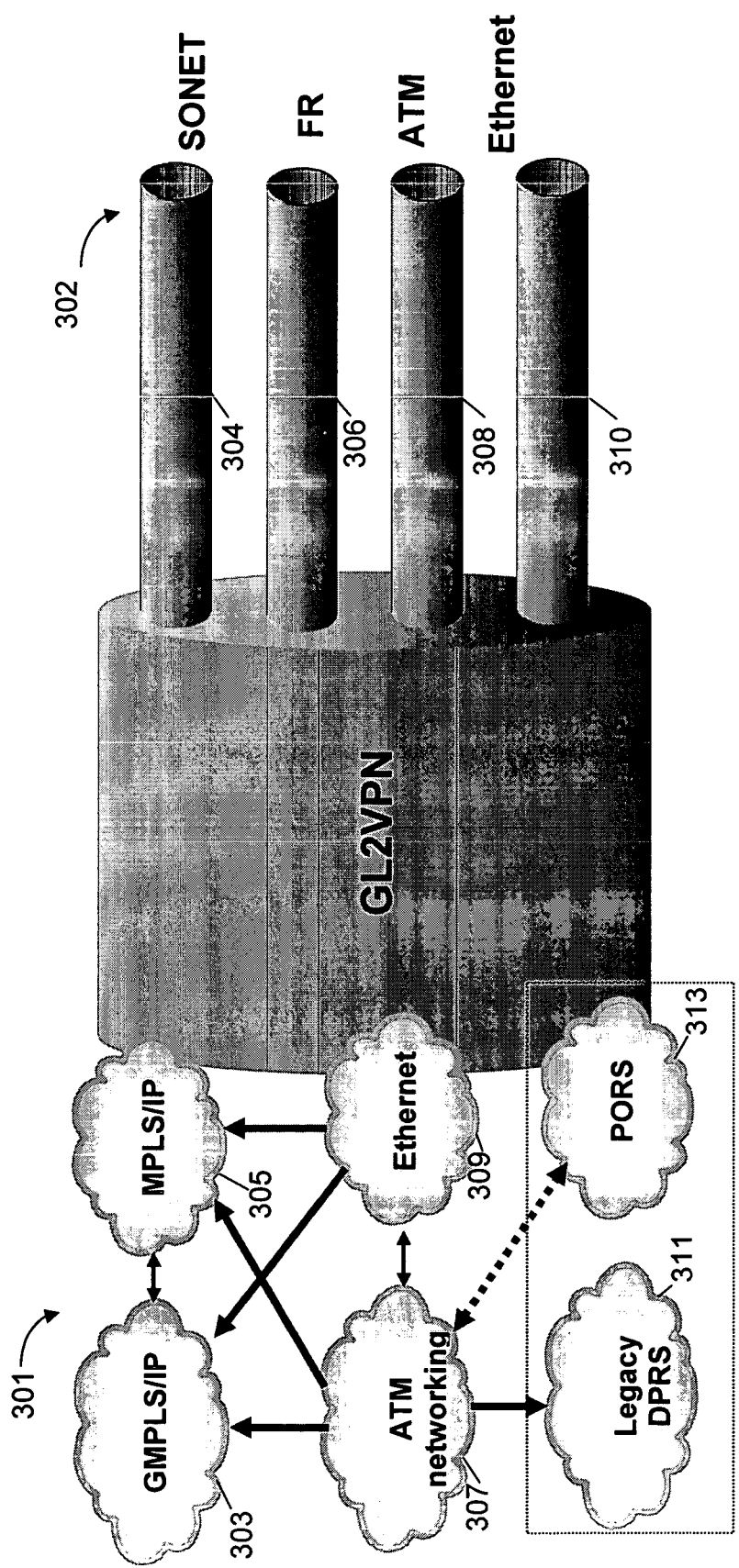
FIG. 3 is a diagram showing network-side services in relation to access-side services according to an embodiment of the invention.

Referring to FIG. 3 there may be seen a schematic diagram showing network-side services in relation to access-side services. On the Network-Side 301 may be seen services such as GMPLS/IP 303, MPLS/IP 305, ATM Networking 307, Ethernet Networking 309, Legacy DPRS 311, and proprietary services such as PORS 313. On the Access-Side 302 may be seen services such as SONET 304, Frame Relay 306, ATM 308, and Ethernet 310.

Figure 4:
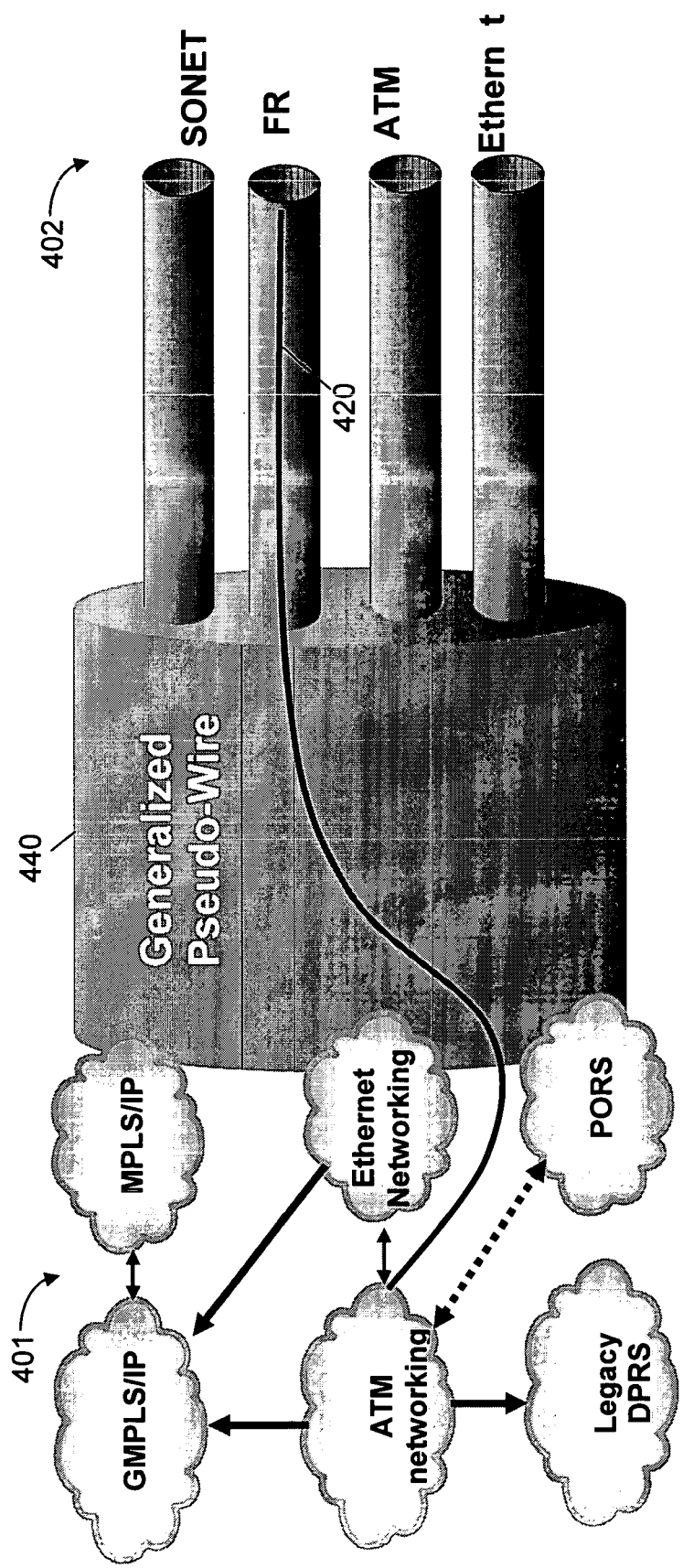
FIG. 4 is a diagram showing a Layer-2 connection according to the network-side and access-side services of FIG. 3.

Referring to FIG. 4 there may be seen the same schematic diagram showing network-side services in relation to access-side services with a connection 420 established from the Access-Side 402 to the Network-Side 401. The Generalized Pseudo-Wire function 440 served by the generalized Layer-2 VPN may be seen in schematic diagram as facilitating a scalable and flexible any access-service to any network.

Figure 5:
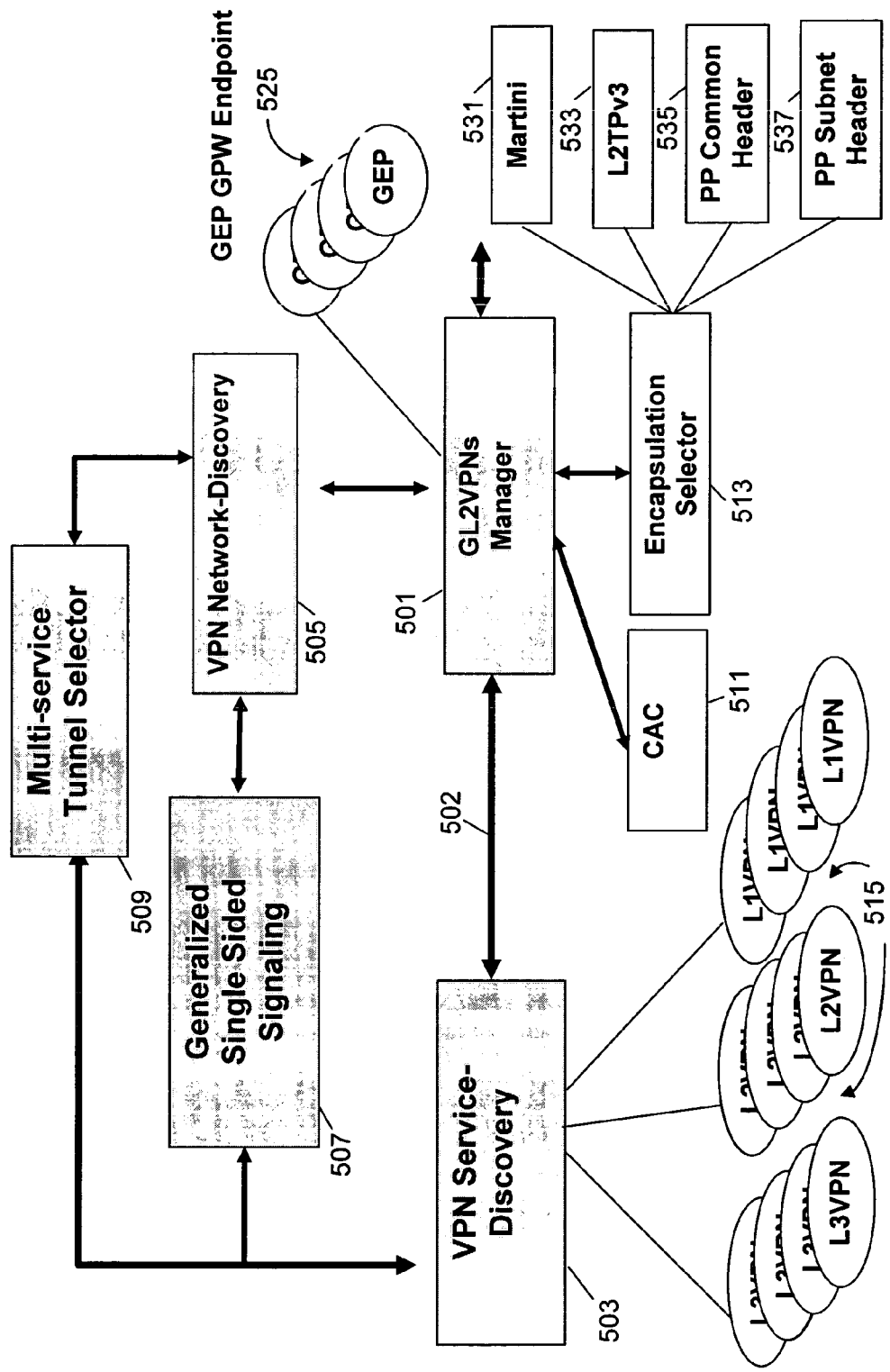
FIG. 5 is a diagram of the main modules of a generalized L2VPN system according to an embodiment of the invention.

Referring to FIG. 5 there may be seen a diagram of the main modules of a generalized L2VPN system. The modules include GL2VPN Manager module 501, a VPN-Service Discovery module 503, a VPN-Network Discovery module 505, a Generalized Single-Sided Signalling module 507, and a Multi-Service Tunnel Selector module 509. These modules coordinate the decisions and service and network selections. Coordinating with the GL2VPN Manager module 501 are the Connection Admission Control (CAC) module 511 and the Encapsulation Selector module 513. The Encapsulation Selector module will have a number of sub-modules related to different encapsulation protocols, for example, Martini-based Encapsulation Protocol 531, Layer2 Tunnelling Protocol Version 3 533, Point-to-Point Common Header Protocol 535, or Point-to-Point Subnet Header Protocol 537. The GL2VPN Manager module 501 will coordinate at 502 with the VPN-Service Discovery module 503 such items as Standards-based "Smart" CAC, and Quality-of-Service/SLA handling. The VPN-Service Discovery module 503 handles examining connected networks to discover and appropriately propagate addressing for the plurality of L1VPNs, L2VPNs, and L3VPNs at 515. Also visible is the connection between the GL2VPN Manager module 501 and the GEP GPW Endpoints 525.

Thus, the foregoing has described a generalized Layer-2 virtual private network (GL2VPN) with advantages including the capability to support any Layer-2 and/or layer-1 VPN service to any network type using scalable common Layer-2 connections, and virtual private networks and without restricting the service provider to a particular transport or technology used within the provider network.

While the invention has been described in conjunction with specific embodiments thereof, it is evident that many alternatives, modifications, and variations will be apparent to those skilled in the art in light of the foregoing description. Accordingly, it is intended to embrace all modifications, variations and adaptations such as may be made to the particular embodiments of the invention described above without departing from the scope of the invention, which is defined in the claims.

What is claimed is:

1. A network for providing multi-service generalized Layer-2 Virtual Private Network (VPN) services, said network comprising:
   a set of elements interconnected by services;
   at least one first subset of said elements defining a private network;
   at least one second subset of elements different from said first subset defining a provider network wherein at least two subgroups of said first subset of elements may be connected via said provider network;
   a provisioning mechanism used to define element membership in said first subset of elements; and
   a signalling mechanism used to create connectivity between elements within said first subset of elements, said connectivity created across said second subset of elements, and said connectivity at a layer selected from one or both of the group consisting of Layer-2 and Layer-1, said signalling mechanism having a multi-service tunnel selector mechanism used to create said connectivity.

2. A network for providing multi-service generalized Layer-2 VPN services as claimed in claim 1, said network further comprising:
   a network discovery mechanism used to propagate membership information regarding elements which are members of said first subset; and
   a service discovery mechanism used to propagate services information regarding services interconnecting elements in said first subset with elements in said second subset.

3. A network for providing multi-service generalized Layer-2 Virtual Private Network (VPN) services, said network comprising:
   a set of elements interconnected by services;
   at least one first subset of said elements defining a private network;
   at least one second subset of elements different from said first subset defining a provider network wherein at least two subgroups of said first subset of elements may be connected via said provider network;
   a provisioning mechanism used to define element membership in said first subset of elements; and
   a signalling mechanism used to create connectivity between elements within said first subset of elements, said connectivity created across said second subset of elements, and said connectivity at a layer selected from one or both of the group consisting of Layer-2 and Layer-1, said signalling mechanism having:
   a multi-service tunnel selector mechanism used to create said connectivity; and
   a manager mechanism having a first portion used to effect connection admission control and a second portion used to select encapsulation in response to a connection request.

4. A network for providing multi-service generalized Layer-2 VPN services as claimed in claim 3, said network further comprising:
   a generalized single-sided signalling mechanism used to initiate said connection request triggered by an element of said first subset.

5. A network for providing multi-service generalized Layer-2 VPN services as claimed in claim 3 wherein said provider network is a non-Multi-Protocol Label Switched provider network.

6. A network for providing multi-service generalized Layer-2 VPN services as claimed in claim 3 wherein said connectivity uses layer-2 pseudo-wires.

7. A network for providing multi-service generalized Layer-2 VPN services as claimed in claim 3 wherein said connectivity uses layer-1 connections.

8. A method of organizing a network having a set of elements interconnected by services, wherein at least one first subset of said elements defines a private network and at least one second subset of elements different from said first subset defines a provider network and wherein at least two subgroups of said first subset of elements may be connected via said provider network, said method comprising:
   defining element membership in said first subset of elements via a provisioning mechanism;
   creating, via a multi-service tunnel selector mechanism, connectivity between elements within said first subset of elements, said connectivity created across said second subset of elements, and said connectivity at a layer selected from one or both of the group consisting of Layer-2 and Layer-1; and
   selecting an encapsulation protocol in response to a connection request via a second portion of a manager mechanism.

9. The method of claim 8, further comprising:
   propagating GL2VPN membership information regarding elements which are members of said first subset via a network discovery mechanism; and
   propagating services information regarding services interconnecting elements in said first subset with elements in said second subset via a service discovery mechanism.

10. The method of claim 8, further comprising:
    effecting connection admission control via a first portion of said manager mechanism.

11. The method of claim 8 further comprising:
    initiating said connection request in response to a trigger by an element of said first subset via a generalized single-sided signalling mechanism.

12. The method of claim 8 wherein said provider network is a non-Multi-Protocol Label Switched provider network.

13. The method of claim 8 wherein said selecting said encapsulation protocol comprises selecting from among a Martini-based Encapsulation Protocol, a Layer2 Tunneling Protocol, a Point-to-Point Common Header Protocol and a Point-to-Point Subnet Header Protocol.

* * * * *